US010133473B2

(12) United States Patent
Hong et al.

(10) Patent No.: US 10,133,473 B2
(45) Date of Patent: Nov. 20, 2018

(54) INPUT APPARATUS AND VEHICLE INCLUDING THE SAME

(71) Applicant: HYUNDAI MOTOR COMPANY, Seoul (KR)

(72) Inventors: Gi Beom Hong, Bucheon-si (KR); Jungsang Min, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 166 days.

(21) Appl. No.: 14/832,515

(22) Filed: Aug. 21, 2015

(65) Prior Publication Data

US 2016/0209975 A1    Jul. 21, 2016

(30) Foreign Application Priority Data

Jan. 20, 2015  (KR) .................. 10-2015-0009029

(51) Int. Cl.
  *G06F 3/0488*   (2013.01)
  *B60K 37/00*    (2006.01)
  *G06F 3/0482*   (2013.01)

(52) U.S. Cl.
  CPC .......... *G06F 3/0488* (2013.01); *B60K 37/00* (2013.01); *G06F 3/0482* (2013.01)

(58) Field of Classification Search
  USPC ....................................................... 345/173
  See application file for complete search history.

(56) References Cited

U.S. PATENT DOCUMENTS

| 2014/0002398 A1* | 1/2014 | Bao ................. G06F 3/0414 345/173 |
| 2014/0317498 A1* | 10/2014 | Okumura ........... G06F 3/04883 715/702 |

FOREIGN PATENT DOCUMENTS

| JP | 2008-9596 A | 1/2008 |
| JP | 2013-149161 A | 8/2013 |
| JP | 2013159273 A | 8/2013 |
| KR | 10-2009-0084767 A | 8/2009 |
| KR | 10-2010-0010628 A | 2/2010 |
| KR | 10-2010-0120767 A | 11/2010 |
| KR | 10-1113906 A | 3/2011 |
| KR | 10-2011-0062062 A | 6/2011 |
| KR | 10-2013-0054579 | 5/2013 |
| KR | 10-2013-0067110 A | 6/2013 |
| KR | 10-2013-0129022 A | 11/2013 |

OTHER PUBLICATIONS

Korean Office Action issued in Korean Application No. 10-2015-0009029 dated May 18, 2016.
Korean Office Action issued in Korean Application No. 10-2015-0009029 dated Sep. 18, 2015, with English Translation.
English Translation of Notice of Allowance issued in Korean Patent Application No. 10-2016-0141340, dated Nov. 10, 2017.

* cited by examiner

*Primary Examiner* — Gustavo Polo
(74) *Attorney, Agent, or Firm* — McDermott Will & Emery LLP

(57) ABSTRACT

An input apparatus includes a touch pad including a virtual touch area, the touch area being divided into one or more touch areas according to an operation screen of a display, the display providing a screen corresponding to the divided touch area, and a controller controlling the division of the touch area and displaying of the display.

29 Claims, 28 Drawing Sheets

INPUT APPARATUS AND VEHICLE INCLUDING THE SAME

CROSS-REFERENCE TO RELATED APPLICATION

This application claims the benefit of priority to Korean Patent Application No. 10-2015-0009029, filed on Jan. 20, 2015 in the Korean Intellectual Property Office, the disclosure of which is incorporated herein by reference.

TECHNICAL FIELD

Embodiments of the present invention relate to an input apparatus and a vehicle including the same, and more particularly, to an input apparatus capable of inputting a gesture of a user and a vehicle including the same.

BACKGROUND

Vehicles include a cluster displaying driving functions and vehicle information such as the speed of the vehicle, revolutions per minute of the engine, the amount of fuel, and coolant, etc.

In addition to basic driving functions, vehicles further include additional functions for convenience of users, for example, an audio function, a video function, a navigation function, air conditioning control, seat control, and lighting control.

To perform the functions of vehicles described above, there may be used an input method using a touch pad, an operating system-based input method using buttons/dials, and an input method using a touch screen.

The input method using a touch pad is a method of inputting commands for performing functions of vehicles using a touch pad mounted on a top of a center console adjacent to an armrest. Recently, research and development have been variously performed to improve the intuitiveness of operating a touch pad.

SUMMARY

Therefore, it is an aspect of the present invention to provide an input apparatus providing a screen corresponding to properties thereof and a vehicle including the same.

Additional aspects of the invention will be set forth in part in the description which follows and, in part, will be obvious from the description, or may be learned by practice of the invention.

In accordance with one aspect of the present invention, an input apparatus includes a touch pad including a virtual touch area, the touch area being divided into one or more touch areas according to an operation screen of a display, the display providing a screen corresponding to the divided touch area, and a controller controlling the division of the touch area and displaying of the display.

The input apparatus may further include one or more buttons provided on the periphery of the touch pad.

The display may provide a first screen corresponding to the touch pad and a second screen corresponding to the buttons.

The first screen may include a metro screen preset according to the operation screen.

The controller may control the division of the touch area to correspond to the metro screen.

When a gesture of a user is inputted into the touch area, the display may provide feedback in a screen area geometrically corresponding to the touch area to which the gesture is inputted.

When a gesture of the user is inputted into the touch area, the display may provide feedback in a screen area relatively corresponding to the touch area to which the gesture is inputted, on the basis of an area presently being provided with feedback.

The one or more buttons may be provided on an edge of the touch pad.

The one or more buttons may include a first button provided on a top end of the touch pad, a second button provided on the left of the touch pad, a third button provided on a bottom end of the touch pad, and a fourth button provided on the right of the touch pad.

When being clicked, the one or more buttons may provide a move to one or more screens selected from the group consisting of a basic menu search screen, a home screen, a bookmark screen, an additional information search screen, and an internal content-related connectivity screen.

The one or more screens selected from the group consisting of the basic menu search screen, the home screen, the bookmark screen, the additional information search screen, and the internal content-related connectivity screen may be provided as a metro form.

The touch pad may include a gesture input area for receiving a gesture of the user and a button area provided below the gesture input area.

The input apparatus may further include a palm rest provided to support a hand of the user during an input operation. Herein the touch pad may be provided on the periphery of the palm rest.

In accordance with another aspect of the present invention, a vehicle includes a touch pad including a virtual touch area, the touch area being divided into one or more touch areas according to an operation screen of a display, the display providing a screen corresponding to the divided touch area, and a controller controlling the division of the touch area and displaying of the display.

The vehicle may further include one or more buttons provided on the periphery of the touch pad.

The display may provide a first screen corresponding to the touch pad and a second screen corresponding to the buttons.

The first screen may include a metro screen preset according to the operation screen.

The controller may control the division of the touch area to correspond to the metro screen.

When a gesture of a user is inputted into the touch area, the display may provide feedback in a screen area geometrically corresponding to the touch area to which the gesture is inputted.

When a gesture of the user is inputted into the touch area, the display may provide feedback in a screen area relatively corresponding to the touch area to which the gesture is inputted, on the basis of an area presently being provided with feedback.

The one or more buttons may be provided on an edge of the touch pad.

The one or more buttons may include a first button provided on a top end of the touch pad, a second button provided on the left of the touch pad, a third button provided on a bottom end of the touch pad, and a fourth button provided on the right of the touch pad.

When being clicked, the one or more buttons may provide a move to one or more screens selected from the group consisting of a basic menu search screen, a home screen, a bookmark screen, an additional information search screen, and an internal content-related connectivity screen.

The one or more screens selected from the group consisting of the basic menu search screen, the home screen, the bookmark screen, the additional information search screen, and the internal content-related connectivity screen may be provided as a metro form.

The touch pad may include a gesture input area for receiving a gesture of the user and a button area provided below the gesture input area.

The vehicle may further include a palm rest provided to support a hand of the user during an input operation. Herein the touch pad may be provided on the periphery of the palm rest. The display may be a display of an audio video navigation (AVN) apparatus of the vehicle.

In accordance with still another aspect of the present invention, a vehicle includes a touch pad including a touch sensitive area, and a display disposed at a dashboard of the vehicle and being spaced-apart from the touch pad. The touch area may be divided into one or more touch areas according to an operation screen of a display.

The vehicle may further include a controller controlling the division of the touch area and displaying of the display.

The vehicle may further include one or more buttons provided on an edge of the touch pad.

The one or more buttons may surround the touch pad.

The display may include a first screen corresponding to the touch pad and a second screen corresponding to the one or more buttons. A layout of the touch pad with reference to the one or more buttons may be geometrically similar to a layout of the first screen with reference to the second screen.

When a gesture of a user is inputted into the touch area, the display may provide feedback in a screen area geometrically corresponding to the touch area to which the gesture is inputted.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Hereinafter, embodiments of the present invention will be described with reference to the attached drawings.

Figure 1:
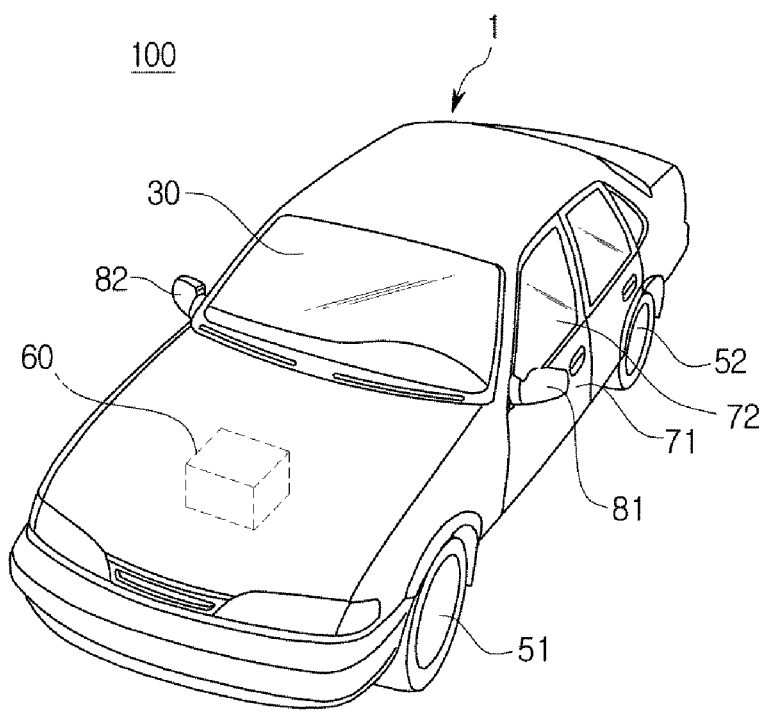
FIG. 1 is an external view of a vehicle in accordance with one embodiment of the present invention.

FIG. 1 is an external view of a vehicle 100 in accordance with one embodiment of the present invention.

Referring to FIG. 1, the vehicle 100 may include a body 1 forming an external appearance of the vehicle 100, a front glass 30 for providing a driver inside the vehicle 100 with a view in front of the vehicle 100, wheels 51 and 52 for moving the vehicle 100, a driving apparatus 60 for allowing the wheels 51 and 52 to spin, a door 71 for shielding the inside of the vehicle 100 from the outside, and side mirrors 81 and 82 providing the driver with a rear view of the vehicle 100.

The front glass 30 is provided on a front top of the body 1 to allow the driver to obtain visual information in front of the vehicle 100, which is called windshield glass.

The wheels 51 and 52 include front wheels 51 provided at the front of the vehicle 100 and rear wheels 52 provided at the rear of the vehicle 100. The driving apparatus 60 may provide one of the front wheels 51 and the rear wheels 52 with torque to allow the body 1 to move forward or backward. The driving apparatus 60 may employ one of an engine generating torque by burning fossil fuels and a motor generating torque by receiving power from a capacitor (not shown).

The door 71 may be provided on the left or right of the body 1 to be pivotable, may allow the driver to get into the vehicle 100 when being open, and may shield the inside of the vehicle 100 when being closed.

The door 71 may include a window 72 to allow the driver to look outside or to look inside. Depending on embodiments, the window 72 may be provided only to allow looking from the one side and may be capable of being open or closed.

The side mirrors 81 and 82 include a left side mirror 81 provided on the left of the body 1 and a right side mirror 82 provided on the right of the body 1 and allow the driver inside the vehicle 100 to obtain visual information from the side and the rear of the vehicle 100.

Figure 2:
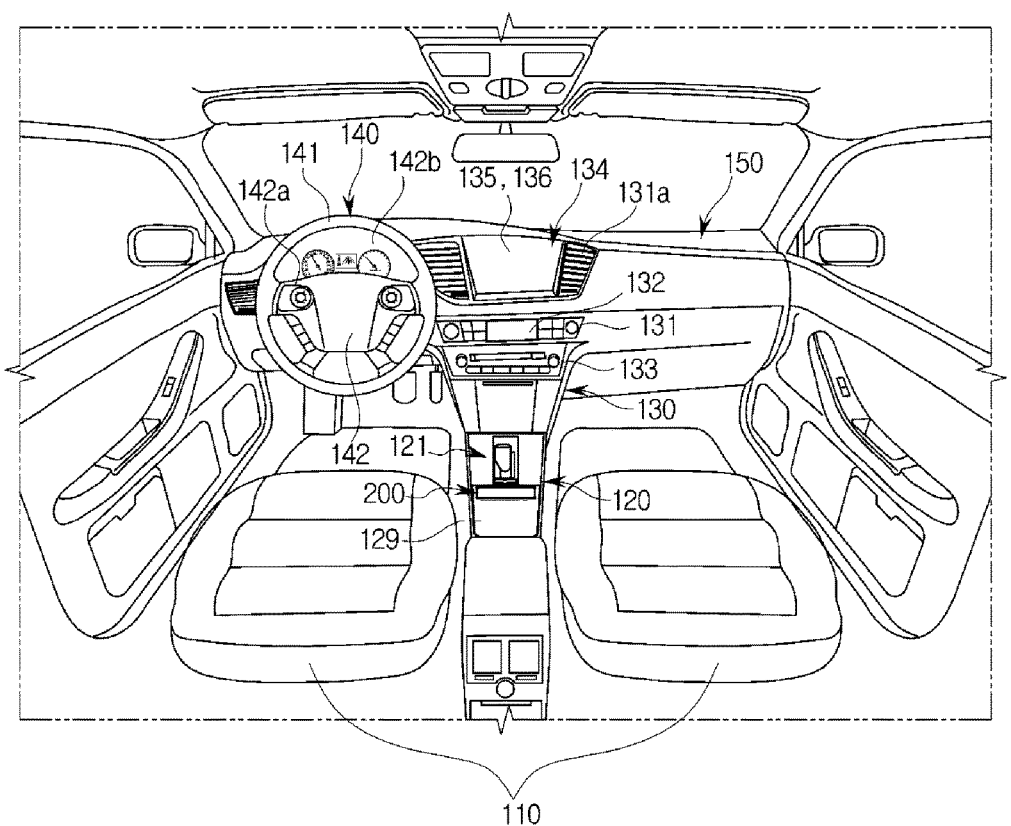
FIG. 2 is an internal configuration view of the vehicle of FIG. 1.
Figure 3:
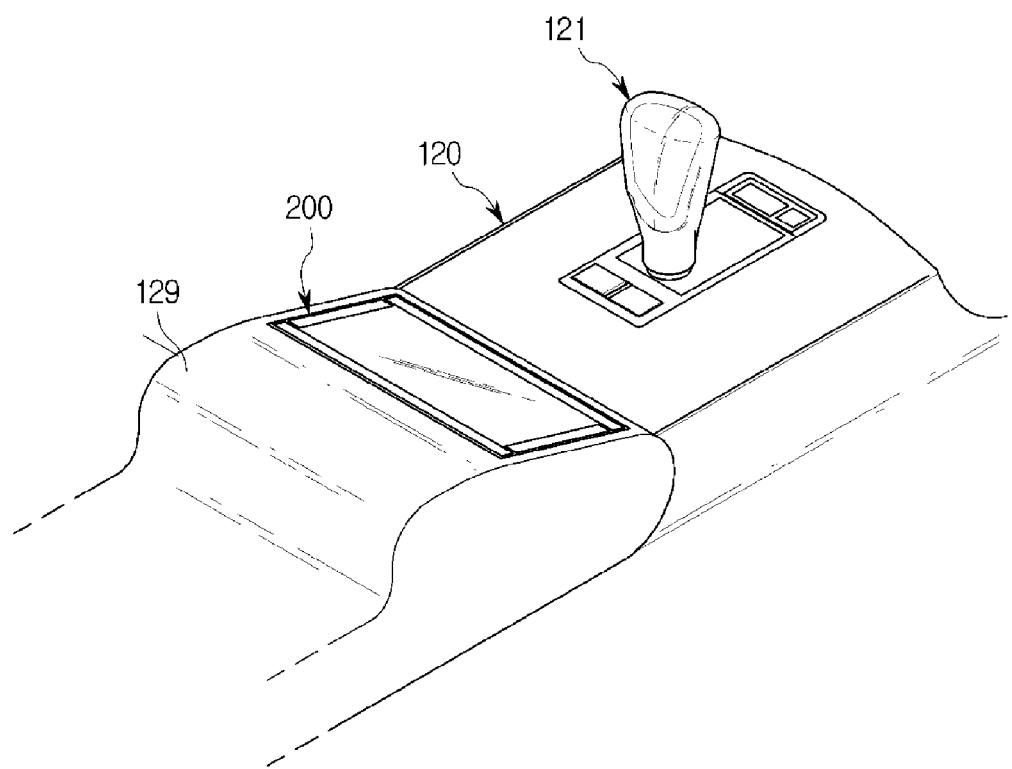
FIG. 3 is a view of an input apparatus installed on a gearbox in accordance with one embodiment of the present invention.

FIG. 2 is an internal configuration view of the vehicle 100, and FIG. 3 is a view illustrating an input apparatus 200 installed on a gearbox 120 in accordance with one embodiment of the present invention.

Referring to FIG. 2, the vehicle 100 may include seats 110 to allow the driver and the like to get thereon, the gearbox 120, and a dashboard 150 including a center fascia 130 and a steering wheel 140.

The gearbox 120 may include a gearshift 121 for changing the speed of the vehicle 100 and the input apparatus 200 for controlling functions of the vehicle 100 to be performed. The input apparatus 200 may function as a centralized operating system and may be inputted based on touch. Referring to FIG. 3, the gearbox 120 may include a palm rest 129 provided to support a hand of a user. The input apparatus 200 may be next to the palm rest 129 to provide the user with convenience of operating. Depending on embodiments, an additional button (not shown) may be provided next to the palm rest 129. The button may be provided at least one depending on embodiments to provide the user with convenience of operating. A detailed configuration of the touch-based input apparatus 200 will be described later.

The center fascia 130 may include an air conditioning apparatus 131, a clock 132, an audio apparatus 133, and an audio video navigation (AVN) apparatus 134.

The air conditioning apparatus 131 controls the temperature, humidity, indoor air quality, and air flow inside the vehicle 100 to keep the inside of the vehicle to be pleasant. The air conditioning apparatus 131 may be installed in the center fascia 130 and may include at least one outlet 131*a* discharging the air. The center fascia 130 may include buttons or dials to control the air conditioning apparatus 131 and the like. The user such as the driver may control the air conditioning apparatus 131 using buttons arranged on the center fascia 130.

The clock 132 may be provided next to buttons or dials to control the air conditioning apparatus 131.

The audio apparatus 133 includes an operating panel including a plurality of buttons for performing functions of the audio apparatus 133. The audio apparatus 133 may provide a radio mode of providing a radio function and a media mode of playing audio files in various storage media containing audio files.

The AVN apparatus 134 may be embedded inside the center fascia 130 of the vehicle 100. The AVN apparatus 134 may perform overall an audio function, a video function, and a navigation function according to the operation of the user. The AVN apparatus 134 may include an input unit 135 for receiving a user command with respect to the AVN apparatus 134 and a display 136 for displaying screens related to the audio function, screens related to the video function, or screens related to the navigation function.

The steering wheel 140 is an apparatus for controlling a driving direction of the vehicle 100 and may include a rim 141 gripped by the driver and spokes 142 connecting the rim 141 with a hub of a rotation axis for steering. Depending on embodiments, various devices of the vehicle 100, such as operating devices 142*a* and 142*b* for controlling an audio apparatus, may be formed at the spokes 142.

Also, the dashboard 150, depending on embodiments, may further include various gauges capable of displaying a driving speed of the vehicle 100, revolutions per minute (RPM) of the engine, or a residual fuel amount and a globe box capable of containing various stuff.

Hereinafter, the input apparatus 200 installed inside the vehicle 100 will be described in detail.

Figure 4:
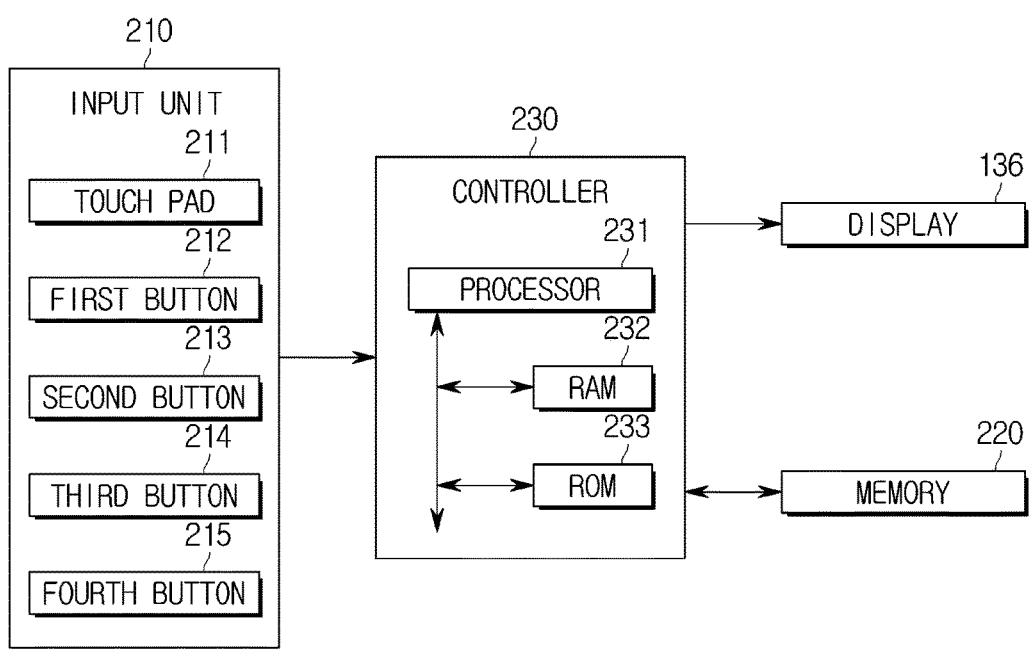
FIG. 4 is a control block diagram of the input apparatus of FIG. 3.
Figure 5:
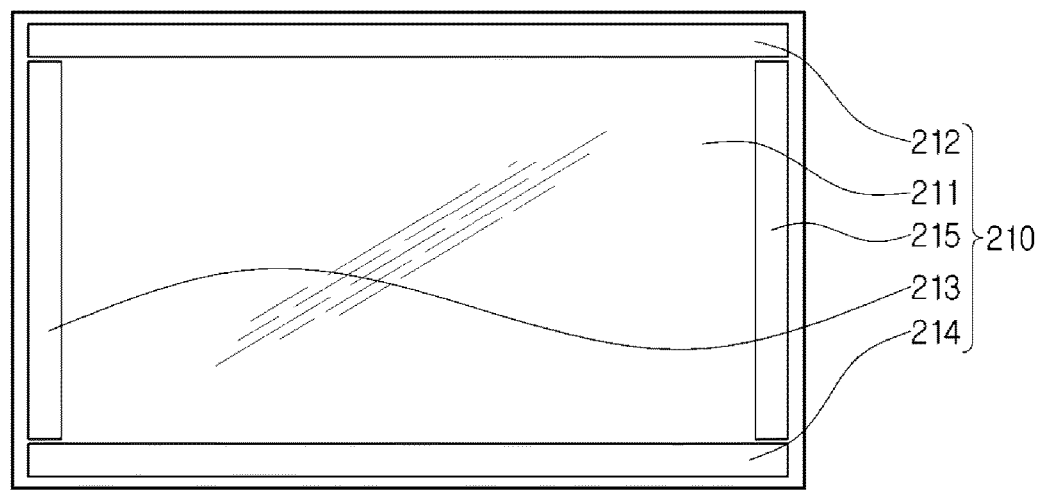
FIG. 5 is an enlarged view of the input apparatus of FIG. 3.
Figure 6:
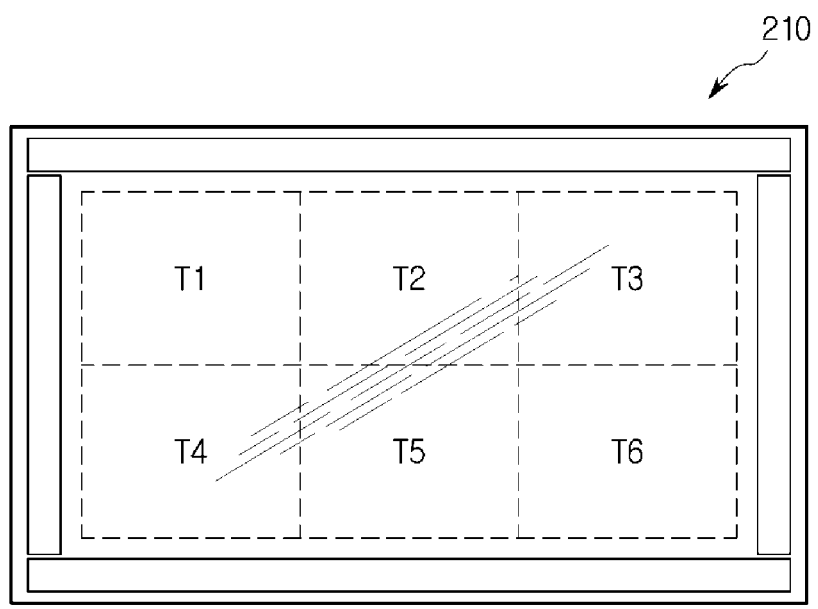
FIG. 6 is a view of an example of a touch area formed on a touch pad.
Figure 7:
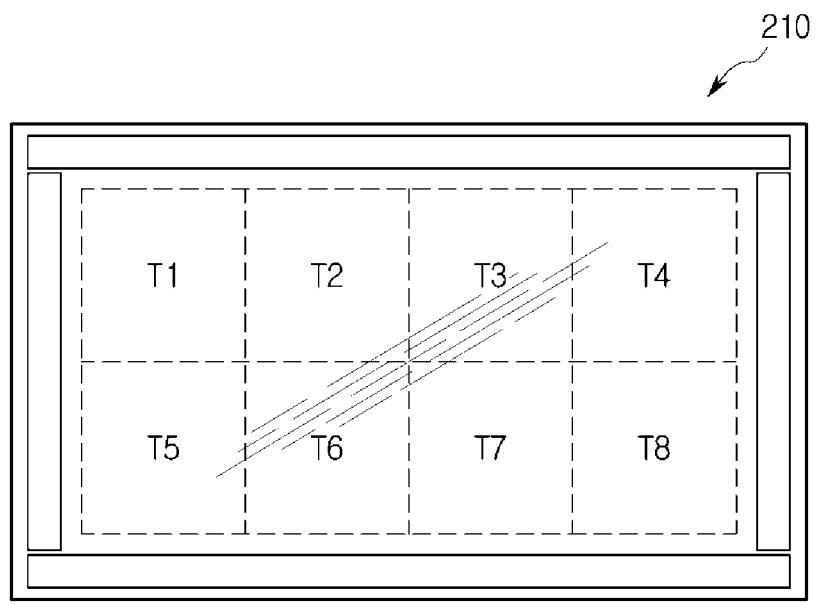
FIG. 7 is a view of another example of the touch area formed on the touch pad.

FIG. 4 is a control block diagram of the input apparatus 200, FIG. 5 is an enlarged view of the input apparatus 200, FIG. 6 is a view of an example of a touch area formed on a touch pad 211, and FIG. 7 is a view of another example of the touch area formed on the touch pad 211.

Referring to FIGS. 4 and 5, the input apparatus 200 may include an input unit 210, the display 136, a memory 220, and a controller 230.

The input unit 210 receives an operation command of the user. The input unit 210 may include the touch pad 211 and one or more buttons provided next to the touch pad 211.

The touch pad 211 may be installed on the gearbox 120 inside the vehicle 100. In general, the gearbox 120 may be installed between a driver's seat and a passengers seat. A repetitive description related to the gearbox 120 will be omitted.

The touch pad 211 may receive a touch gesture of the user to operate the vehicle 100. The touch pad 211 may be provided in various types including a pressure-sensitive type and a capacitive type. When the touch pad 211 is the pressure-sensitive type, data of a point pressurized by a finger or a pen may be obtained. When the touch pad 211 is the capacitive type, capacitive data varying with a touch of the user may be obtained. Depending on embodiments, the touch pad 211 may be provided as a button type. Data obtained through such ways may be provided to the controller 230 that will be described later.

The touch pad 211 may have the touch area on a top thereof. The touch area is to receive a touch signal of the user to operate the vehicle 100, which may be a virtual area formed on the top of the touch pad 211. The touch area may vary with a screen of the display 136.

In more detail, the screen of the display 136 may provide a metro screen preset according to an operation environment and the touch area may vary with the metro screen. Hereinafter, the term metro screen will be defined as a user interface screen based on buttons having a tile shape, which is applied to Windows phones 7 and 8 by Microsoft Corp. The metro screen may include tetragonal blocks only formed of plane without lines. The tetragonal blocks may be designated as metro areas or metro icons.

For example, when a metro screen formed of six tetragons is provided as a home screen, the touch area, as shown in FIG. 6, may be divided into six touch areas T1, T2, T3, T4, T5, and T6. Depending on embodiments, when a metro screen formed of eight tetragons is provided as a home screen, the touch area, as shown in FIG. 7, may be divided into eight touch areas T1, T2, T3, T4, T5, T6, T7, and T8. The division of the touch area is not limited thereto but may vary with a configuration of the metro screen.

One or more buttons may be provided on an edge of the touch pad 211. The one or more buttons may include a first button 212 provided on a top end of the touch pad 211, a second button 213 provided on the left of the touch pad 211, a third button 214 provided on a bottom end of the touch pad 211, and a fourth button 215 provided on the right of the touch pad 211. In FIGS. 4 and 5, there are shown four buttons as an example but the number of buttons is not limited thereto.

The buttons may provide a move to one or more screens selected from the group consisting of a basic menu search screen, a home screen, a bookmark screen, an additional information search screen, and an internal content-related connectivity screen, which will be described later.

The display 136 may be provided in the center of an upper part of the center fascia 130 and may display a vehicle-operating screen inputted into the touch pad 211. The display 136 may be a display of the AVN apparatus 134. Hereinafter, the vehicle-operating screen displayed on the display 136 of the AVN apparatus 134 will be described as an example.

The display 136 may provide the vehicle-operating screen corresponding to the input unit 210. In detail, the display 136 may provide a first screen corresponding to the touch pad 211 and a second screen corresponding to the first button 212 to the fourth button 215.

Figure 8:
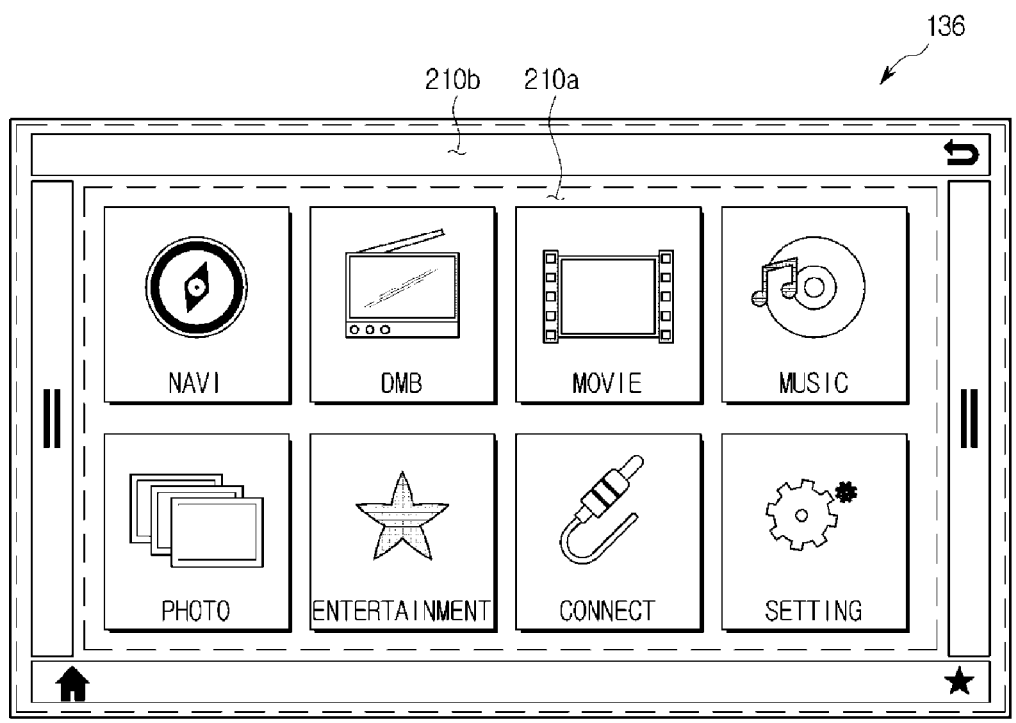
FIG. 8 is a view of an example of the configuration of a screen of a display.

FIG. 8 is a view of an example of a configuration of the screen on the display 136. In FIG. 8, there is shown a home environment as an example, for convenience of description.

Referring to FIG. 8, a first screen 210a may include a metro screen preset according to an operation environment. The operation environment may include the home environment, a bookmark environment, and a text input environment but is not limited thereto.

A second screen 210b may be arranged on an edge of the first screen 210a. The arrangement of the second screen 210b with respect to the first screen 210a may employ the arrangement of the buttons with respect to the touch pad 211, which may improve intuitive operations of the user and may reduce an operation time.

The memory 220 may store various data, a program, and applications to drive and control the input apparatus 200. As an example, the memory 220 may store the program allowed to recognize an operation command of the user inputted into the touch pad 211 and exclusive applications initially provided by a manufacturer or universal applications externally downloaded.

The memory 220 may store information on touch gestures of the user. For example, information on text or a group of candidate texts which can be inputted into the touch pad 211 may be stored.

The memory 220 may store information on a method of recognizing touch gestures of the user. For example, information on whether to use an absolute response or a relative response between the touch area and the screen of the display 136 may be stored.

The memory 220 may store information on a metro screen configured differently depending on a vehicle-operating environment and information on a touch area division method according to the metro screen.

The memory 220 may include one or more storage media of a flash memory, a hard disk, a card type memory such as a secure digital (SD) memory card and an extreme digital (XD) memory, a random access memory (RAM), a static random access memory (SRAM), a read-only memory (ROM), an electrically erasable programmable read-only memory (EEPROM), a programmable read-only memory (PROM), a magnetic memory, a magnetic disc, and an optical disc. However, the memory 220 is not limited thereto and may include changes within the range of being easily employed by those skilled in the art.

The controller 230 may include a processor 231, a ROM 233 storing a control program for controlling the input apparatus 200, and a RAM 232 storing externally inputted signals or data or used as a storage area corresponding to various operations executed by the input apparatus 200. The processor 231, the ROM 233, and the RAM 232 may be connected to one another through an internal bus.

The controller 230 may be embodied by the processor 231, may control overall operations of the input apparatus 200 and a signal flow between internal components of the input apparatus 200, and may process data.

The controller 230 may divide the touch area of the touch pad 211 into one or more touch areas corresponding to the screen of the display 136 as an operation environment of the display 136 changes. In more detail, the touch area may be divided into one or more touch areas corresponding to the metro screen.

When a touch gesture of the user is inputted into a divided touch area, the controller 230 may provide feedback in an area of the screen of the display 136 corresponding to the touch area. Herein, the touch area and the screen of the display 136 may absolutely or relatively respond to each other (hereinafter, referred to as an absolute response and a relative response, respectively).

The absolute response means dividing the touch area into absolute areas according to a screen ratio of the display 136, regardless of sizes of the touch pad 211 and display 136. When a gesture of the user is inputted into a touch area, feedback may be provided to an area of the screen of the display 136 geometrically corresponding to the touch area.

The relative response means that regardless of absolute coordinates of an initial point and an end point of a user gesture inputted into the touch pad 211, the initial point of the user gesture is recognized as coordinates of a central point of a feedback providing area. When a user gesture having a vector component is inputted into a touch area, feedback may be provided to an area of the screen of the display 136 corresponding to the vector component.

Figure 9:
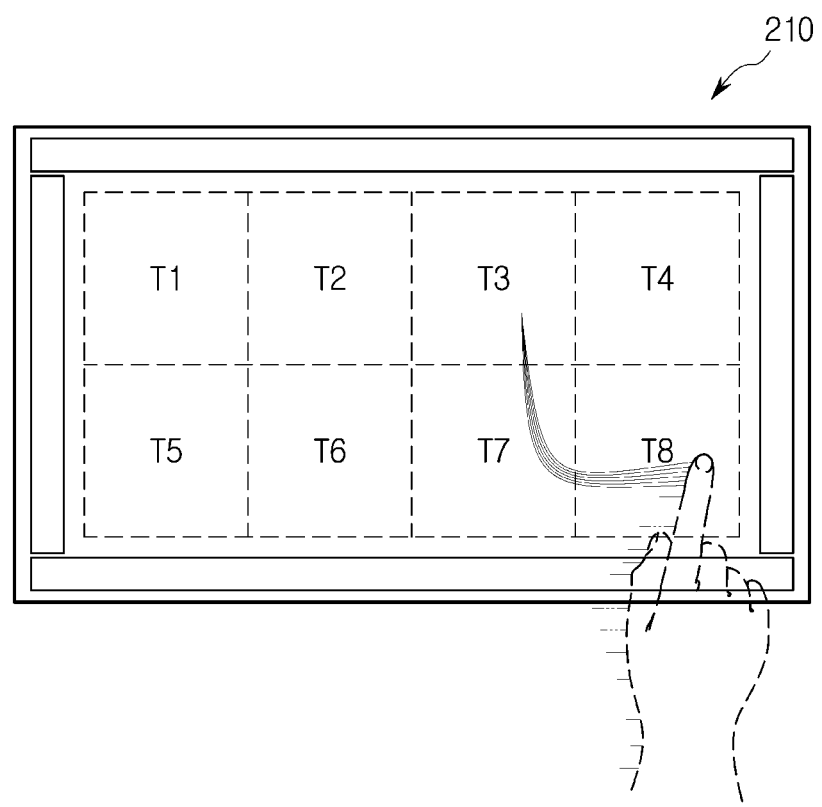
FIG. 9 is a view illustrating an example of inputting a gesture of a user.
Figure 10:
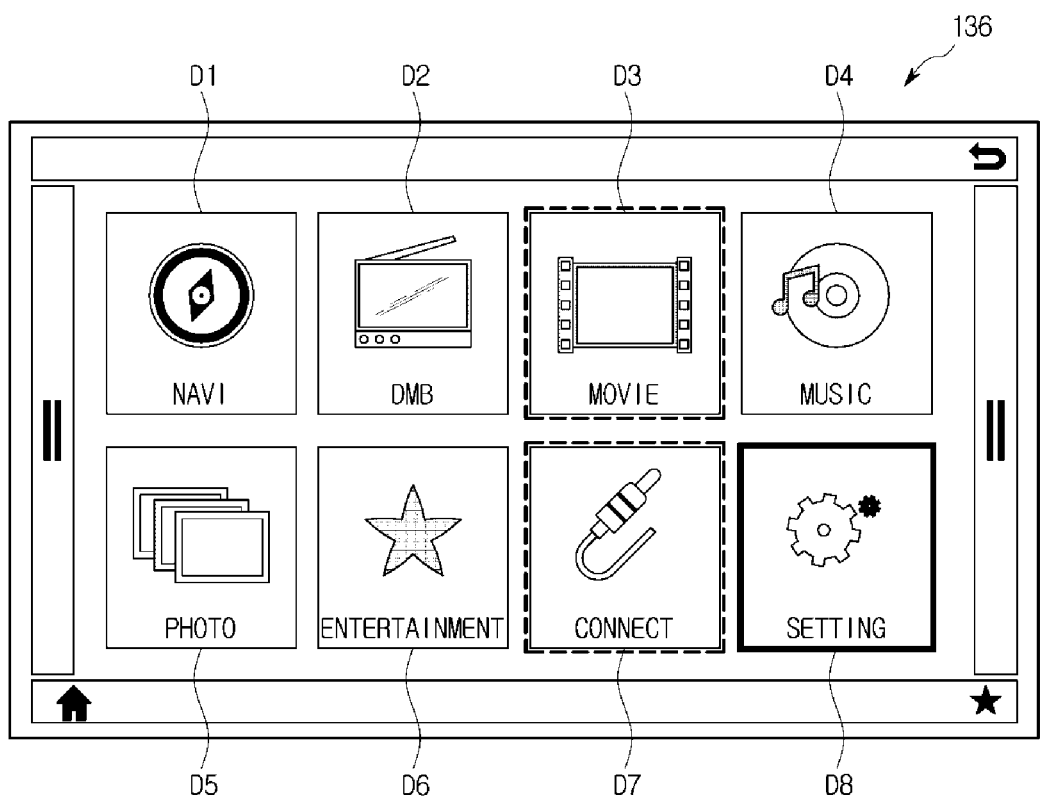
FIG. 10 is a view illustrating an example of feedback provided on the screen of the display according to the sequence of inputting the gesture of the user.
Figure 11:
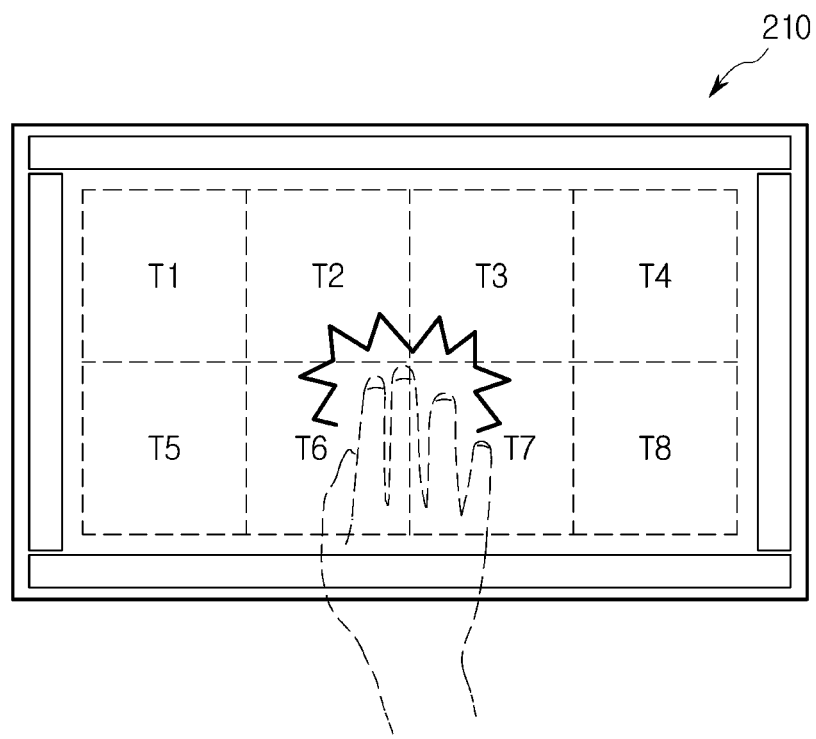
FIG. 11 is a view illustrating an example of inputting the gesture of the user to enter a feedback providing screen.
Figure 12:
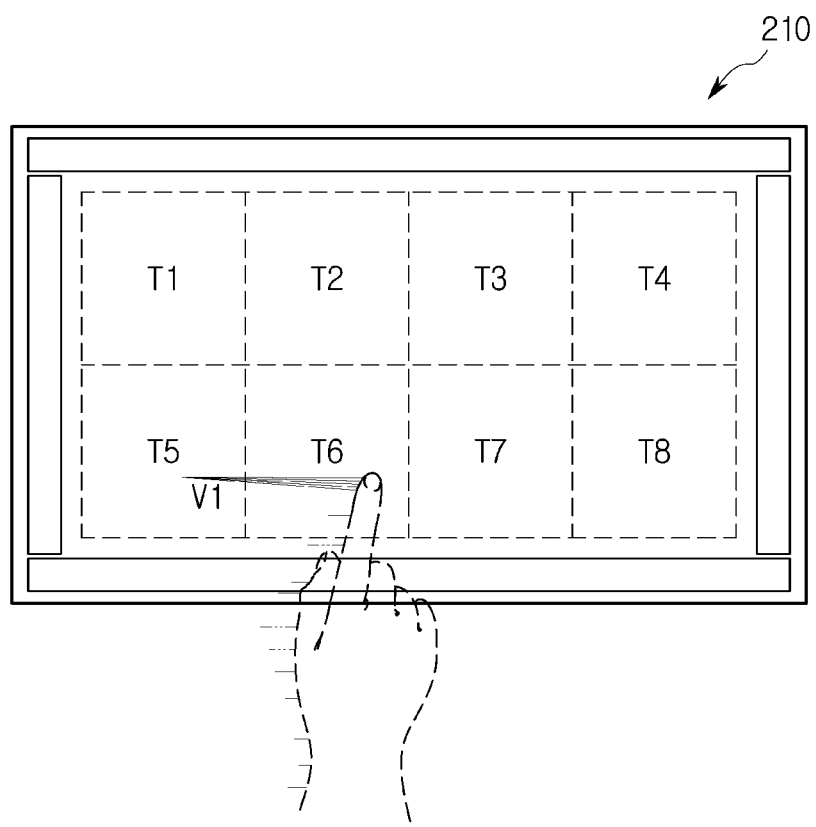
FIG. 12 is a view illustrating another example of inputting the gesture of the user.
Figure 13:
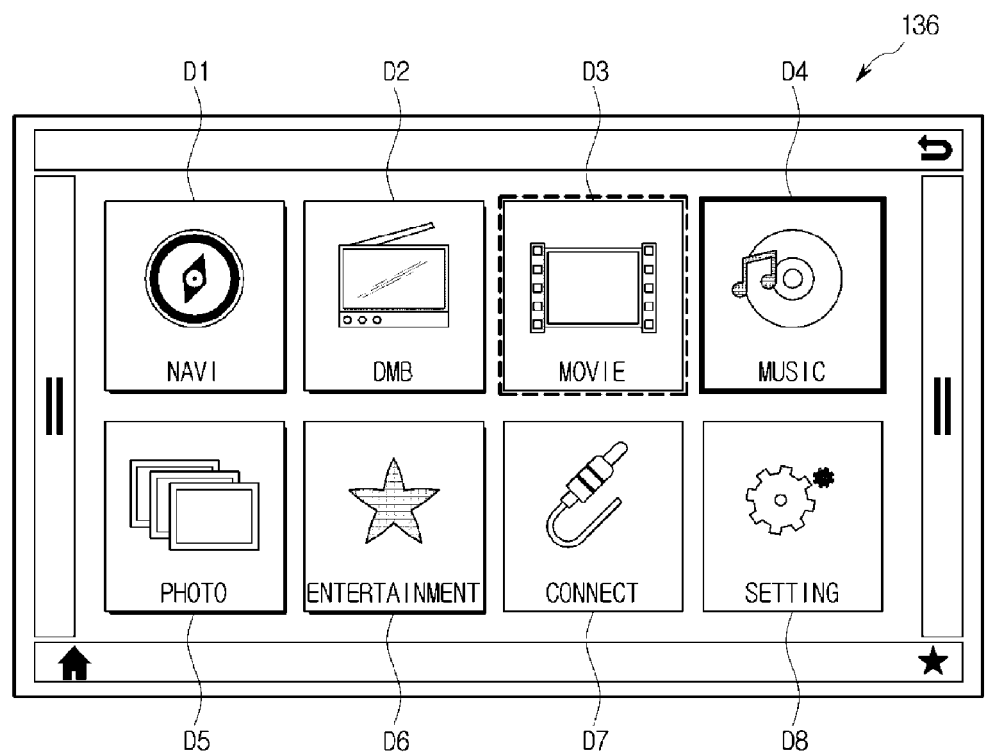
FIG. 13 is a view illustrating an example of feedback provided on the screen of the display according to the input of the gesture of the user.

Hereinafter, the absolute response and the relative response will be described in detail with reference to the drawings. FIGS. 9 to 11 illustrate an example of the absolute response, and FIGS. 12 and 13 illustrate an example of the relative response.

FIG. 9 is a view illustrating an example of inputting a gesture of the user, FIG. 10 is a view illustrating an example of feedback provided on the screen of the display 136 according to the sequence of inputting the gesture of the user, and FIG. 11 is a view illustrating an example of inputting the gesture of the user to enter a feedback providing screen.

As shown in FIG. 9, when a gesture of the user is inputted into a touch area, feedback may be provided to an area of the screen of the display 136 geometrically corresponding to the touch area. A method of providing the feedback in the area of the screen of the display 136, as shown in FIG. 10, may employ a method of highlighting the periphery of a corresponding metro area but is not limited thereto.

The gesture of the user, as shown in FIG. 8, may be inputted sequentially into an area T3, an area T7, and an area T8 among a plurality of touch areas. In this case, as shown in FIG. 10, the periphery of an area D3, an area D7, and an area D8, which are metro areas geometrically corresponding to the area T3, the area T7, and the area T8, may be sequentially highlighted in the screen of the display 136.

Also, while the area D8 is being highlighted, when the user clicks the whole touch pad 211 as shown in FIG. 11, it is possible to enter a corresponding metro area. Depending on embodiments, an additional button for input may be provided around the touch pad 211 and it is possible to enter the corresponding metro area by clicking the button.

FIG. 12 is a view illustrating an example of inputting a gesture of the user, and FIG. 13 is a view illustrating an example of feedback provided on the screen of the display 136 according to the input of the gesture of the user.

In the relative response method, an initial point of the gesture of the user may be recognized as coordinates of a central point of a feedback providing area. That is, as shown in FIGS. 12 and 13, the area T5, which is the initial point of the gesture of the user, may be recognized as coordinates of a central point of the area D3 that is a feedback providing area at a point in time of inputting the gesture of the user.

In this state, when a gesture of the user, having a vector component shown as V1 is sequentially inputted, feedback may be provided to the area D4 that is an area of the screen of the display 136 corresponding to the vector component V1. A method of providing the feedback in the area of the screen of the display 136, as shown in FIG. 13, may employ a method of highlighting the periphery of a corresponding metro area but is not limited thereto.

When a command of the user is inputted to the first button 212 to the fourth button 215, the controller 230 may control the display 136 to display a screen corresponding to the command of the user. The first button 212 to the fourth button 215 may provide a move to one or more screens selected from the group consisting of an upper tab screen, a basic menu search screen, a home screen, a bookmark screen, an additional information search screen, and an internal content-related connectivity screen.

Hereinafter, for example, it will be described that a move to the upper tab screen is provided when the first button 212 is clicked, a move to the basic menu search screen is provided when the second button 213 is clicked, a move to one of the home screen and the bookmark screen is provided when the third button 214 is clicked, and a move to one of the additional information search screen and the internal content-related connectivity screen is provided when the fourth button 215 is clicked. However, a purpose of providing the respective buttons is not limited to the screen move function described above.

When the user clicks the first button 212, the upper tab screen may be displayed. In detail, when the first button 212 is clicked while displaying a music play screen, a music playlist screen that is an upper tab of the music play screen may be displayed.

When the user clicks the second button 213, the basic menu search screen may be displayed.

Figure 14:
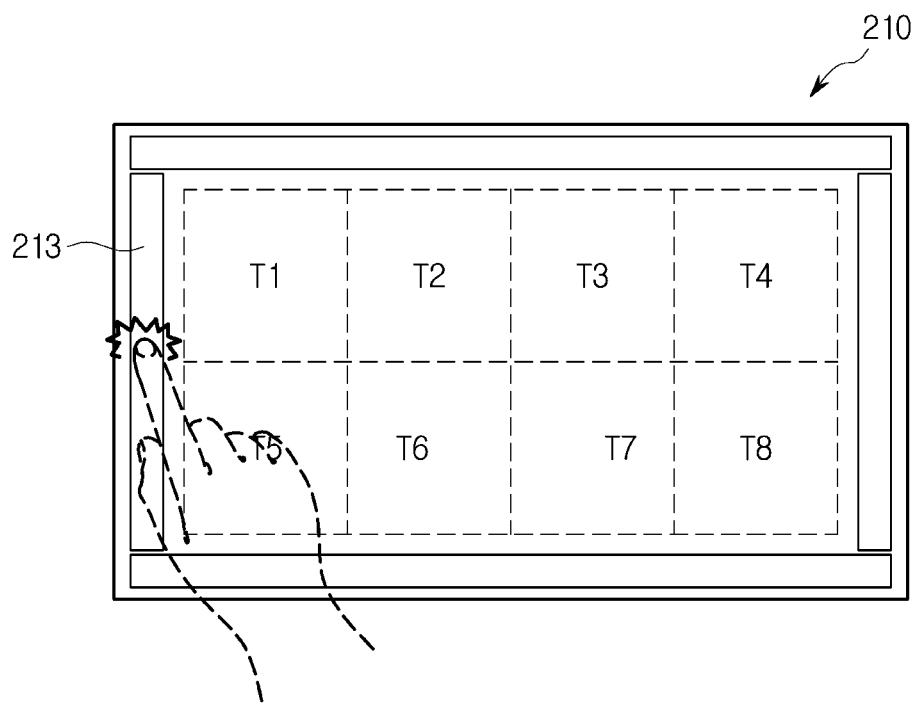
FIG. 14 is a view illustrating that the user clicks a second button.
Figure 15:
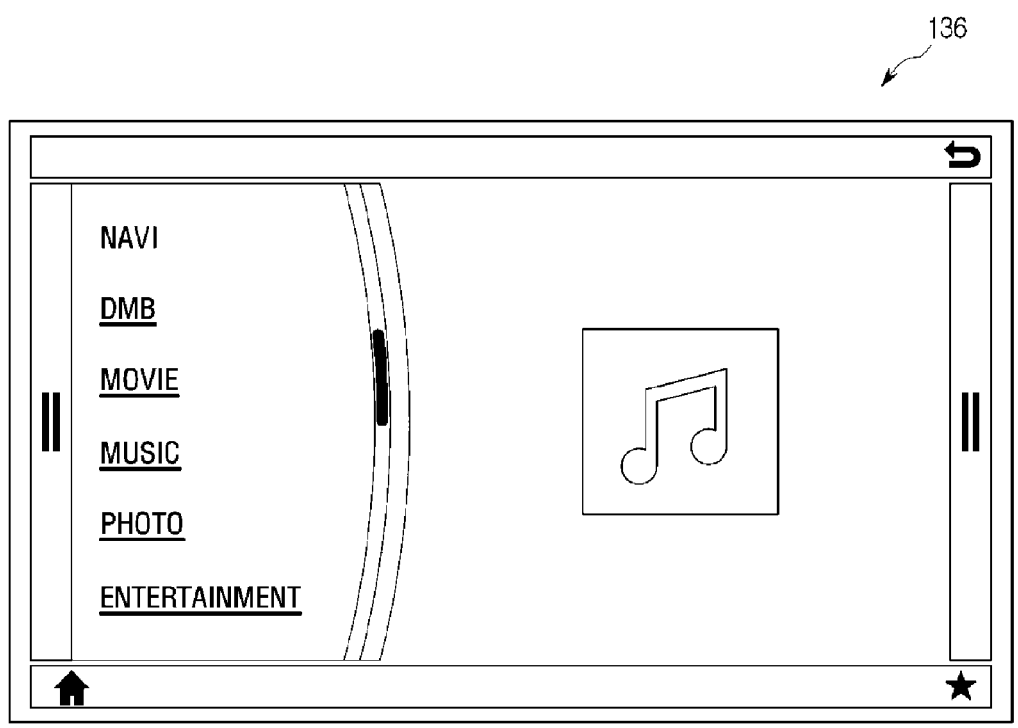
FIG. 15 is a view illustrating an example of a basic menu search screen provided when the second button is clicked.

FIG. 14 is a view illustrating that the user clicks the second button 213, and FIG. 15 is a view illustrating an example of the basic menu search screen provided when the second button 213 is clicked.

Referring to FIGS. 14 and 15, the user may click the second button 213 provided on a left edge of the touch pad 211 while certain services are being provided. When the second button 213 is clicked, the basic menu search screen may be provided on the left of the display 136. The basic menu search screen may include menus such as navigation, digital multimedia broadcasting (DMB), movie, music, image, and entertainments. Menus set initially or menus arbitrarily reconfigured by the user may be provided as basic menus.

When the user clicks the third button 214, one of the home screen and the bookmark screen may be displayed. The third button 214 may include a home button and a bookmark button or may be provided as a single button depending on embodiments.

Figure 16:
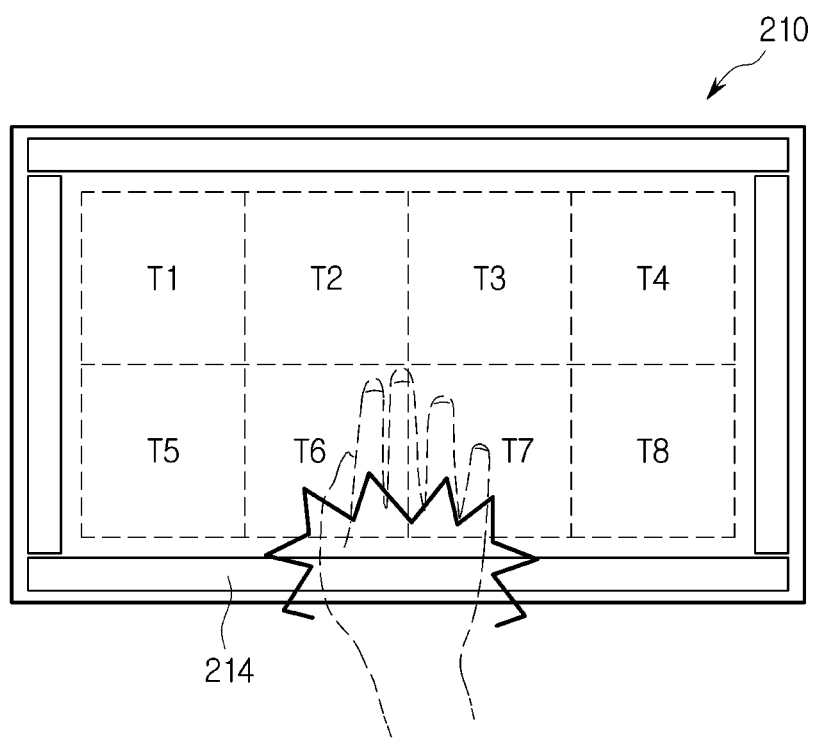
FIG. 16 is a view illustrating that the user clicks a third button.
Figure 17:
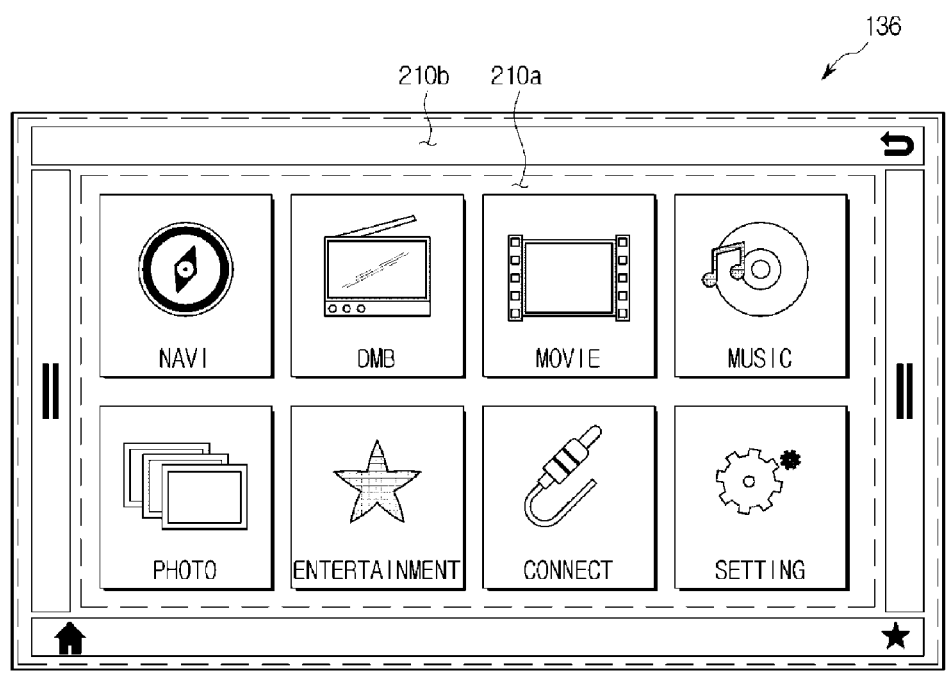
FIG. 17 is a view illustrating an example of a home screen provided when the third button is clicked.
Figure 18:
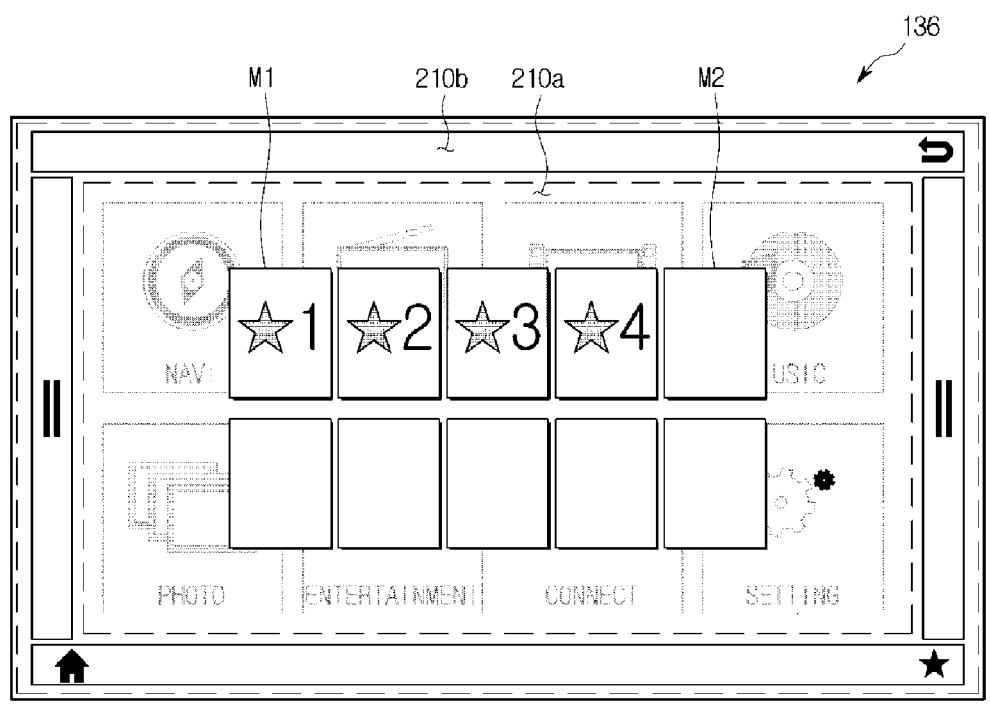
FIGS. 18 to 20 are views illustrating an example of a bookmark screen.
Figure 19:
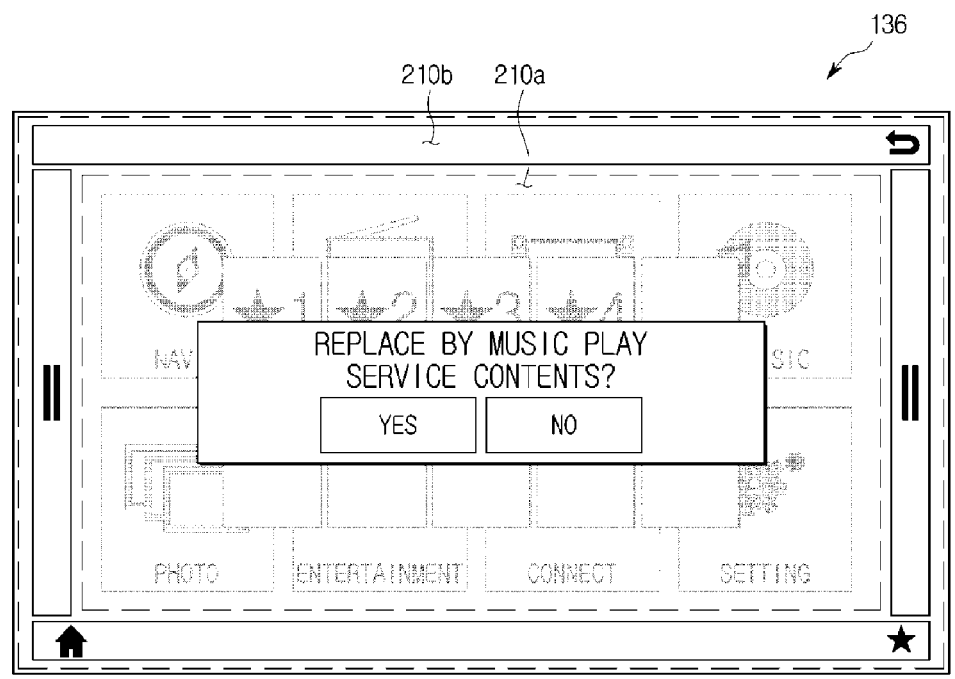
Figure 20:
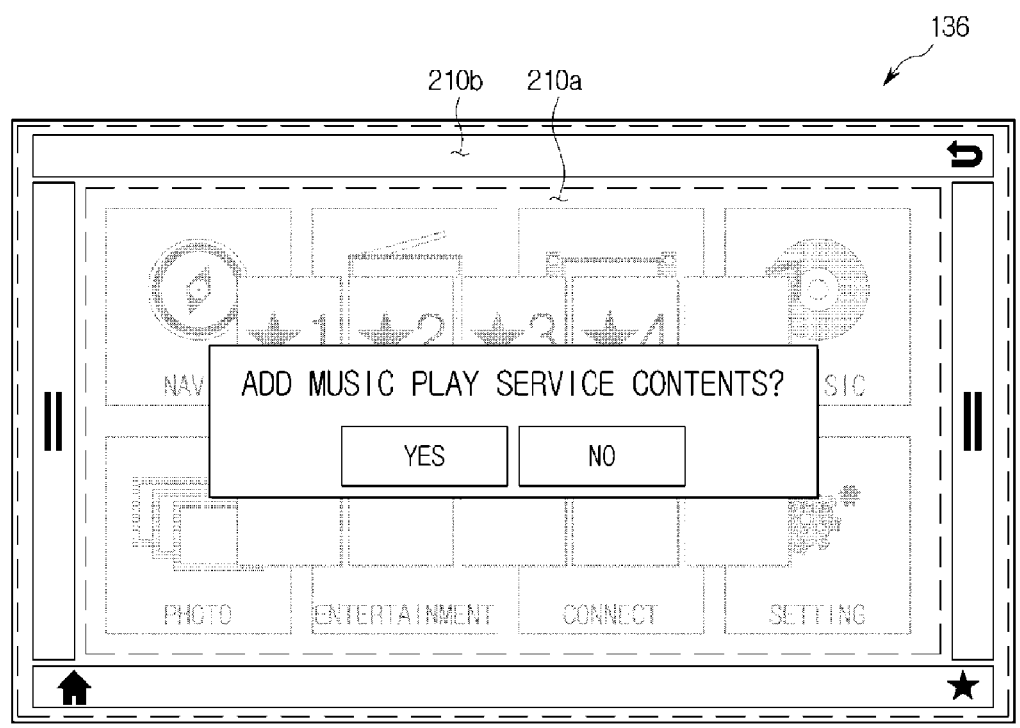

FIG. 16 is a view illustrating that the user clicks the third button 214, FIG. 17 is a view illustrating an example of the home screen provided when the third button 214 is clicked, and FIGS. 18 to 20 are views illustrating an example of the bookmark screen.

Referring to FIG. 16, the user may click the third button 214 using a palm while putting a wrist on an armrest 219 (refer to FIG. 3). The armrest 219 may be ergonomically designed to provide the user with convenience. Depending on embodiments, it is possible to click the third button 214 using a finger.

When the third button 214 is clicked, the home screen may be provided.

As shown in FIG. 17, the first screen 210a may include a navigation icon, a DMB icon, a movie icon, a music icon, a photo album icon, an entertainment icon, an external input icon, and a setting icon. There is shown the example of the home screen in FIG. 17, but the home screen is not limited thereto.

When the third button 214 is clicked, the bookmark screen may be provided. The bookmark screen may be provided as a popup form on the first screen 210a. The bookmark screen may be provided as being opaque or translucent. The bookmark screen may also be provided as a metro type. There is shown the example of the bookmark screen divided into ten metro areas in FIG. 18, but the bookmark screen is not limited thereto.

Referring to FIG. 18, when an M1 area in the bookmark screen is being clicked for a first preset time, a bookmark function corresponding to the M1 area may be performed.

Referring to FIGS. 18 and 19, when the M1 area in the bookmark screen is being clicked for a second preset time, a message window for asking whether to replace the M1 area by present contents may be provided. For example, when the bookmark function is performed while providing music playing services and the M1 area is being clicked for the second preset time, a message window for asking whether to replace the M1 area by music playing service contents may be provided. Herein, the first preset time may differ from the second preset time, and depending on embodiments, may be shorter or longer than the second preset time.

Referring to FIGS. 18 to 20, when an area of the bookmark screen not to provide a bookmark function, for example, an M2 area is being clicked for a third preset time, a message window for asking whether to add present contents to the bookmark screen may be provided. For example, when the bookmark function is performed while providing music playing services and the M2 area is being clicked for the third preset time, a message window for asking whether to add music playing service contents to the M2 area may be provided. Herein, the third preset time may differ from the second preset time or may be the same as the second preset time.

When the user clicks the fourth button 215, one of the additional information search screen and the internal content-related connectivity screen may be displayed. The fourth button 215 may include an additional information search button and an internal content-related connectivity button, respectively, and may be provided as a single button depending on embodiments.

Figure 21:
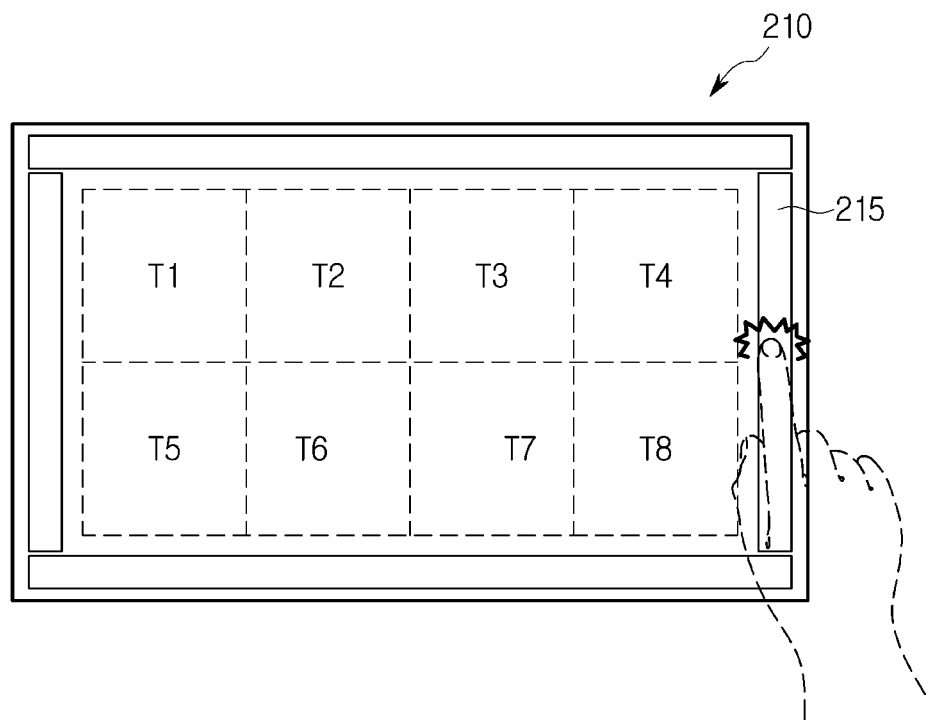
FIG. 21 is a view illustrating that the user clicks a fourth button.
Figure 22:
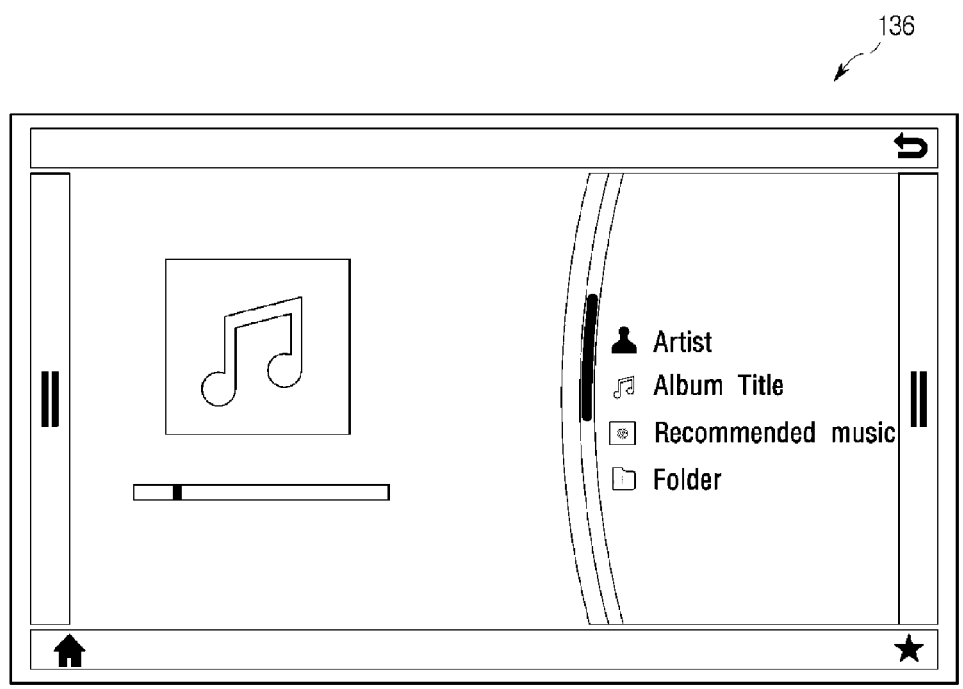
FIG. 22 is a view illustrating an example of an additional information search screen provided when the fourth button is clicked.
Figure 23:
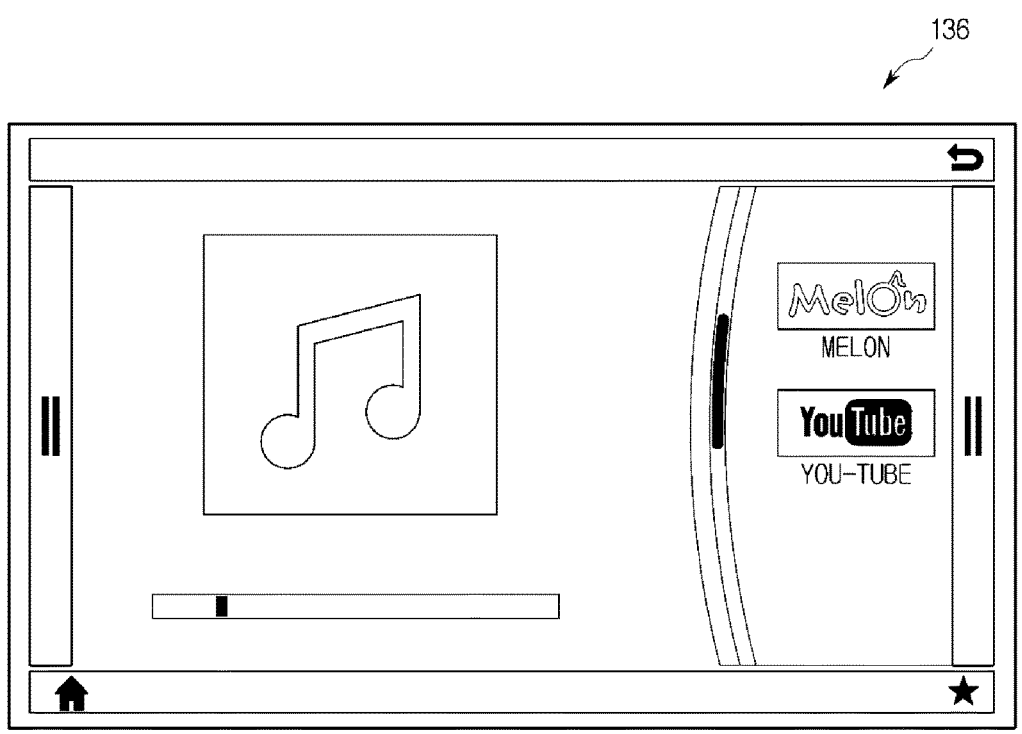
FIG. 23 is a view illustrating an example of an internal content-related connectivity screen provided when the fourth button is clicked.

FIG. 21 is a view illustrating that the user clicks the fourth button 215, FIG. 22 is a view illustrating an example of the additional information search screen provided when the fourth button 215 is clicked, and FIG. 23 is a view illustrating an example of the internal content-related connectivity screen provided when the fourth button 215 is clicked.

Referring to FIGS. 21 and 22, the user may click the fourth button 215 provided on a right edge of the touch pad 211 while certain services are being provided.

When the fourth button 215 is clicked, the additional information search screen may be provided on the right of the display 136. The additional information search screen may be configured differently depending on services presently being provided. For example, when the fourth button 215 is clicked while providing a music play screen, an additional information search screen with respect to the music play screen such as artist information, record information, recommended song information and the like may be provided. The additional information search screen may provide initially set menus or menus reconfigured by the user.

Also, as shown in FIG. 23, when the fourth button 215 is clicked, the internal content-related connectivity screen may be provided on the right of the display 136. The internal content-related connectivity screen may be configured differently depending on services presently being provided. For example, when the fourth button 215 is clicked while providing music services, a connectivity screen related to playing music may be provided. The connectivity screen related to playing music may include a Melon icon, a Youtube icon and the like but is not limited thereto.

Hereinafter, a method of inputting text in the input apparatus 200 will be described.

Figure 24:
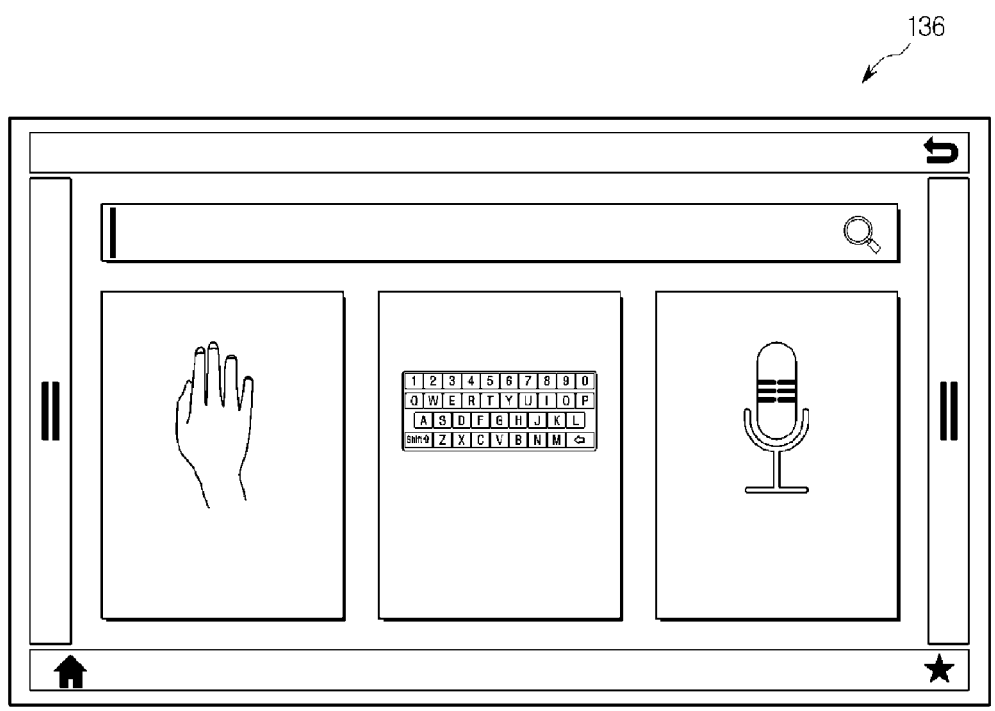
FIG. 24 is a view illustrating an example of a screen for selecting a text input method.
Figure 25:
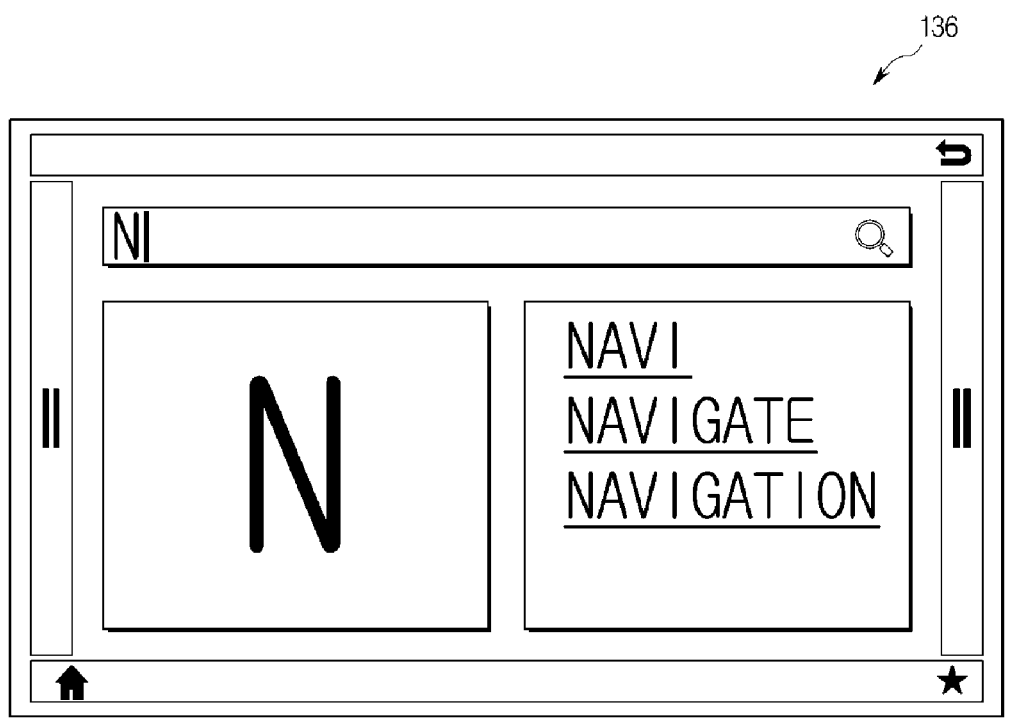
FIG. 25 is a view illustrating an example of a text input screen.

FIG. 24 is a view illustrating a screen for selecting a text input method, and FIG. 25 is a view illustrating an example of a text input screen.

Referring to FIG. 24, an input box may be provided on an upper part of a content area of the screen and a metro icon for guiding the text input method may be provided below the input box. An example of providing metro icons for selecting one of a handwriting input method, a qwerty input method, and a voice input method as an input method is shown in FIG. 24 but is not limited thereto.

As an example, when the user selects the handwriting input method, as shown in FIG. 25, a handwriting input screen may be provided. The handwriting input screen may include an input box on an upper part, an area for providing a text being inputted in real time, and an area for displaying a group of candidates of the text being inputted below the input box.

Hereinafter, a method of selecting a screen in the input apparatus 200 will be described.

Figure 26:
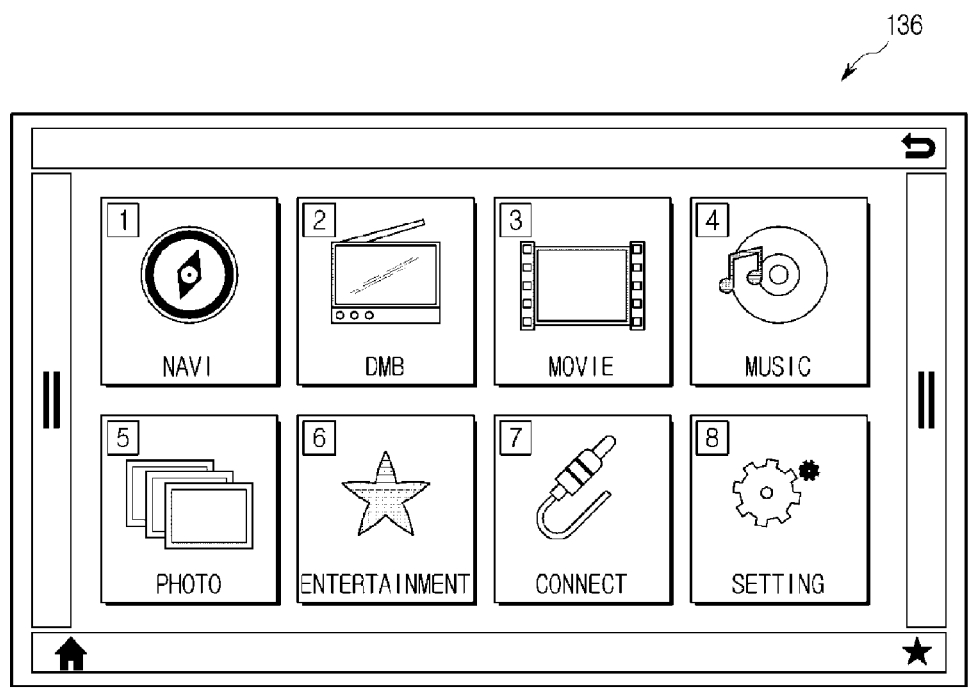
FIGS. 26 to 28 are views illustrating an example of selecting a screen in accordance with one embodiment of the present invention.
Figure 27:
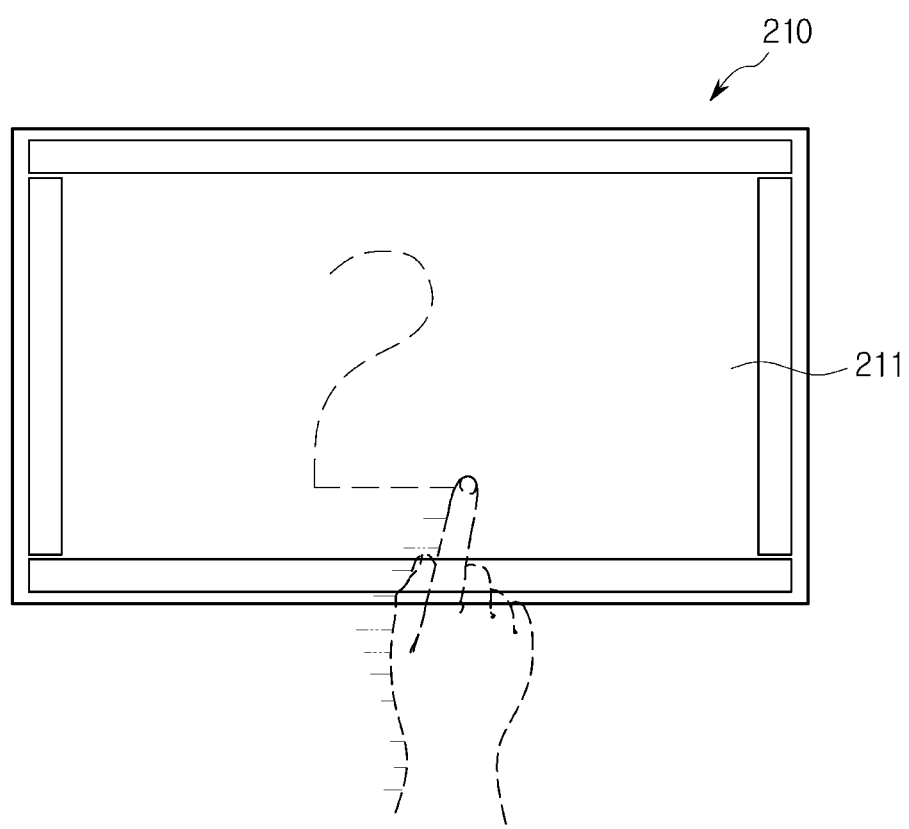
Figure 28:
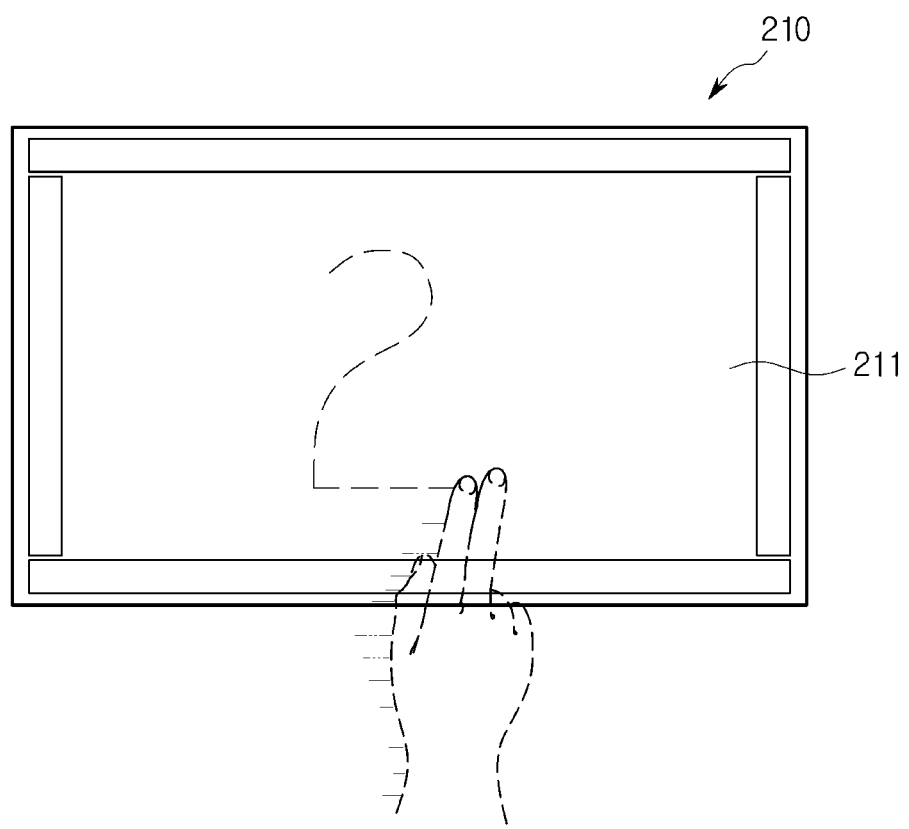

FIGS. 26 to 28 are views illustrating an example of selecting a screen in the input apparatus 200 in accordance with one embodiment of the present invention.

As shown in FIG. 26, a plurality of metro icons forming a metro screen may be classified using numbers or symbols. FIG. 26 illustrates respective metro areas classified as numbers, which will be described hereafter.

In this case, a desired metro icon may be selected by inputting a number given to the metro icon. For example, as shown in FIGS. 27 and 28, a metro area designated as the number 2 may be selected by inputting the number 2 into the touch pad 211 using an index finger or using both an index finger and a middle finger. However, an example of fingers used for inputting text is not limited thereto.

As described above, the input apparatus 200 and the vehicle 100 including the same have been described. The technical scope of the present invention is not limited by the embodiments described above and will be understood to include variations within the range easily made by those skilled in the art.

As is apparent from the above description, an input apparatus and a vehicle including the same in accordance with one embodiment of the present invention may improve intuitive operations of a user.

An input apparatus and a vehicle including the same in accordance with another embodiment of the present invention may reduce operation system installation costs.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An input apparatus comprising:
a touch pad including a virtual touch area;
a display physically separated from the touch pad and including an operation screen, wherein the virtual touch area is divided into one or more touch areas corresponding to the operation screen; and
a controller controlling the division of the virtual touch area and displaying of the display,
wherein when a gesture of a user is inputted into the touch area, the display provides feedback in a screen area geometrically corresponding to the touch area to which the gesture is inputted.

2. The input apparatus of claim 1, further comprising one or more buttons provided on the periphery of the touch pad.

3. The input apparatus of claim 2, wherein the display provides a first screen corresponding to the touch pad and a second screen corresponding to the buttons.

4. The input apparatus of claim 3, wherein the first screen comprises a metro screen preset according to the operation screen.

5. The input apparatus of claim 4, wherein the controller controls the division of the touch area to correspond to the metro screen.

6. The input apparatus of claim 1, wherein when the gesture of the user is inputted into the touch area, the display provides feedback in a screen area relatively corresponding to the touch area to which the gesture is inputted, on the basis of an area presently being provided with feedback.

7. The input apparatus of claim 2, wherein the one or more buttons are provided on an edge of the touch pad.

8. The input apparatus of claim 2, wherein the one or more buttons comprise a first button provided on a top end of the touch pad, a second button provided on the left of the touch pad, a third button provided on a bottom end of the touch pad, and a fourth button provided on the right of the touch pad.

9. The input apparatus of claim 2, wherein when being clicked, the one or more buttons provide a move to one or more screens selected from the group consisting of a basic menu search screen, a home screen, a bookmark screen, an additional information search screen, and an internal content-related connectivity screen.

10. The input apparatus of claim 9, wherein the one or more screens selected from the group consisting of the basic menu search screen, the home screen, the bookmark screen, the additional information search screen, and the internal content-related connectivity screen are provided as a metro form.

11. The input apparatus of claim 1, wherein the touch pad comprises:
a gesture input area for receiving the gesture of the user; and
a button area provided below the gesture input area.

12. The input apparatus of claim 1, further comprising a palm rest provided to support a hand of a user during an input operation,
wherein the touch pad is provided on the periphery of the palm rest.

13. A vehicle comprising:
a touch pad comprising a virtual touch area;
a display physically separated from the touch pad and including an operation screen, wherein the virtual touch area is divided into one or more touch areas corresponding to the operation screen; and a controller controlling the division of the virtual touch area and displaying of the display, wherein when a gesture of a user is inputted into the touch area, the display provides feedback in a screen area geometrically corresponding to the touch area to which the gesture is inputted.

14. The vehicle of claim 13, further comprising one or more buttons provided on the periphery of the touch pad.

15. The vehicle of claim 14, wherein the display provides a first screen corresponding to the touch pad and a second screen corresponding to the buttons.

16. The vehicle of claim 15, wherein the first screen comprises a metro screen preset according to the operation screen.

17. The vehicle of claim 16, wherein the controller controls the division of the touch area to correspond to the metro screen.

18. The vehicle of claim 13, wherein when the gesture of the user is inputted into the touch area, the display provides feedback in a screen area relatively corresponding to the touch area to which the gesture is inputted, on the basis of an area presently being provided with feedback.

19. The vehicle of claim 14, wherein the one or more buttons are provided on an edge of the touch pad.

20. The vehicle of claim 14, wherein the one or more buttons comprise a first button provided on a top end of the touch pad, a second button provided on the left of the touch pad, a third button provided on a bottom end of the touch pad, and a fourth button provided on the right of the touch pad.

21. The vehicle of claim 14, wherein when being clicked, the one or more buttons provide a move to one or more screens selected from the group consisting of a basic menu search screen, a home screen, a bookmark screen, an additional information search screen, and an internal content-related connectivity screen.

22. The vehicle of claim 21, wherein the one or more screens selected from the group consisting of the basic menu search screen, the home screen, the bookmark screen, the additional information search screen, and the internal content-related connectivity screen are provided as a metro form.

23. The vehicle of claim 13, wherein the touch pad comprises:

a gesture input area for receiving the gesture of the user; and a button area provided below the gesture input area.

24. The vehicle of claim 13, further comprising a palm rest provided to support a hand of a user during an input operation, wherein the touch pad is provided on the periphery of the palm rest, and the display is a display of an audio video navigation (AVN) apparatus of the vehicle.

25. A vehicle comprising:

a touch pad including a touch sensitive area; and a display disposed at a dashboard of the vehicle and being physically separated from the touch pad, wherein the touch sensitive area is divided into one or more touch areas according to an operation screen of the display, and wherein when a gesture of a user is inputted into the touch area, the display provides feedback in a screen area geometrically corresponding to the touch area to which the gesture is inputted.

26. The vehicle of claim 25, further comprising a controller controlling the division of the touch area and displaying of the display.

27. The vehicle of claim 25, further comprising one or more buttons provided on an edge of the touch pad.

28. The vehicle of claim 27, wherein the one or more buttons surround the touch pad.

29. The vehicle of claim 27, wherein the display includes a first screen corresponding to the touch pad and a second screen corresponding to the one or more buttons, wherein a layout of the touch pad with reference to the one or more buttons is geometrically similar to a layout of the first screen with reference to the second screen.

* * * * *